(12) United States Patent
Harding et al.

(10) Patent No.: US 11,633,634 B2
(45) Date of Patent: Apr. 25, 2023

(54) CUT-RESISTANT LEADING EDGE FALL ARREST SYSTEM AND METHOD

(71) Applicant: MSA Technology, LLC, Cranberry Township, PA (US)

(72) Inventors: Jeffrey F. Harding, Pittsburgh, PA (US); Mitchell H. Hetrich, Greenville, PA (US); Gregory M. Grupp, Seven Fields, PA (US)

(73) Assignee: MSA Technology, LLC, Cranberry Township, PA (US)

(*) Notice: Subject to any disclaimer, the term of this patent is extended or adjusted under 35 U.S.C. 154(b) by 1001 days.

(21) Appl. No.: 16/375,586

(22) Filed: Apr. 4, 2019

(65) Prior Publication Data

US 2019/0308041 A1 Oct. 10, 2019

Related U.S. Application Data

(60) Provisional application No. 62/653,995, filed on Apr. 6, 2018.

(51) Int. Cl.
*A62B 35/04* (2006.01)
*B65H 75/48* (2006.01)
(Continued)

(52) U.S. Cl.
CPC .......... *A62B 35/04* (2013.01); *A62B 35/0018* (2013.01); *A62B 35/0075* (2013.01);
(Continued)

(58) Field of Classification Search
CPC .......... A62B 35/04; B65H 75/48; G01L 5/047
See application file for complete search history.

(56) References Cited

U.S. PATENT DOCUMENTS 3,760,910 A * 9/1973 Koshihara ............... F16D 59/00
182/237
3,804,698 A * 4/1974 Kinloch .................. B60R 22/28
428/176
(Continued)

FOREIGN PATENT DOCUMENTS

CN 101506001 A 8/2009
CN 102883780 A 1/2013
(Continued)

OTHER PUBLICATIONS

ANSI Z359 (Year: 1999).*
(Continued)

*Primary Examiner* — Brian D Mattei
*Assistant Examiner* — Kathleen M. McFarland
(74) *Attorney, Agent, or Firm* — Jones Day

(57) ABSTRACT

A fall arrest system includes a line retraction device having a safety line, an energy absorber configured for connecting to a terminal end of the safety line, and a harness configured for connecting to the energy absorber such that the energy absorber is disposed between the terminal end of the safety line and the harness. The safety line is selected to have a predetermined mean breaking force with a first standard deviation, and the energy absorber is selected to have a predetermined mean deployment force with a second standard deviation. The mean breaking force of the safety line and the mean deployment force of the energy absorber overlap over an overlapping region of the first and second standard deviation. A ratio of an overlap mean force of the overlapping region to an overlap standard deviation of the overlapping region is less than or equal to 6.

20 Claims, 7 Drawing Sheets

(51) Int. Cl.
*A62B 35/00* (2006.01)
*G01L 5/04* (2006.01)

(52) U.S. Cl.
CPC ......... *A62B 35/0093* (2013.01); *B65H 75/48* (2013.01); *G01L 5/047* (2013.01); *A62B 35/0056* (2013.01)

(56) References Cited

U.S. PATENT DOCUMENTS

| | | | | | |
|---|---|---|---|---|---|
| 5,287,950 | A | * | 2/1994 | Feathers | A62B 35/0093 192/223.4 |
| 5,343,976 | A | * | 9/1994 | Ostrobrod | A62B 1/06 182/4 |
| 5,797,558 | A | * | 8/1998 | Peterson | B65H 75/48 242/378.2 |
| 6,330,861 | B1 | * | 12/2001 | Flux | A62B 35/0087 104/115 |
| 6,338,399 | B1 | * | 1/2002 | Choate | A62B 35/0056 188/374 |
| 8,374,752 | B2 | * | 2/2013 | Breuninger | B60R 21/0132 280/739 |
| 8,584,799 | B1 | * | 11/2013 | Dennington | A62B 35/04 182/4 |
| 8,733,790 | B2 | * | 5/2014 | Yoo | B60R 21/0136 280/735 |
| 9,199,103 | B2 | * | 12/2015 | Hetrich | A62B 1/10 |
| 9,861,841 | B1 | * | 1/2018 | Hung | A62B 1/10 |
| 10,888,723 | B2 | * | 1/2021 | Thompson | H02S 99/00 |
| 11,260,253 | B2 | * | 3/2022 | Thompson | A62B 99/00 |
| 2003/0057018 | A1 | * | 3/2003 | Dodson | A62B 35/0018 182/3 |
| 2005/0051659 | A1 | * | 3/2005 | Wolner | A62B 35/0093 242/383.5 |
| 2007/0215410 | A1 | * | 9/2007 | Ecker | A62B 1/08 182/192 |
| 2008/0041661 | A1 | * | 2/2008 | Meillet | A62B 35/0056 182/13 |
| 2008/0179136 | A1 | * | 7/2008 | Griffith | A62B 35/04 182/5 |
| 2009/0078505 | A1 | * | 3/2009 | Casebolt | A62B 35/0093 254/266 |
| 2009/0211847 | A1 | * | 8/2009 | Balquist | A62B 35/0093 182/231 |
| 2010/0025148 | A1 | * | 2/2010 | Dawson | A62B 35/0012 182/3 |
| 2010/0226748 | A1 | * | 9/2010 | Wolner | A62B 35/0093 414/815 |
| 2010/0236867 | A1 | * | 9/2010 | Jones | A62B 35/0093 188/374 |
| 2011/0100766 | A1 | * | 5/2011 | Auston | A62B 35/0093 188/65.1 |
| 2011/0186675 | A1 | * | 8/2011 | Osaki | B60R 22/44 242/372 |
| 2012/0145481 | A1 | * | 6/2012 | Jones | A62B 35/0093 182/231 |
| 2013/0054180 | A1 | * | 2/2013 | Barfield | G01P 15/0891 702/141 |
| 2013/0105246 | A1 | * | 5/2013 | Schlangen | F16F 7/006 112/440 |
| 2014/0138186 | A1 | * | 5/2014 | Macy | A62B 35/0093 182/236 |
| 2014/0151155 | A1 | * | 6/2014 | Choate | A62B 35/0075 182/239 |
| 2014/0251731 | A1 | * | 9/2014 | Jones | A62B 35/0068 182/231 |
| 2015/0217151 | A1 | * | 8/2015 | Jones | F16F 7/123 182/234 |
| 2016/0001100 | A1 | * | 1/2016 | Hirst | A62B 35/0062 182/236 |
| 2016/0016023 | A1 | * | 1/2016 | Myer | A62B 35/0093 242/370 |
| 2016/0023024 | A1 | * | 1/2016 | Casebolt | A62B 35/04 188/376 |
| 2016/0096048 | A1 | * | 4/2016 | Fegley | A62B 1/10 182/232 |
| 2016/0220857 | A1 | * | 8/2016 | Rappoport | A62B 35/0075 |
| 2017/0252591 | A1 | * | 9/2017 | Hetrich | F16F 9/145 |
| 2017/0361136 | A1 | * | 12/2017 | Wu | A62B 35/0093 |
| 2018/0015312 | A1 | * | 1/2018 | Jones | A62B 35/04 |
| 2018/0028844 | A1 | * | 2/2018 | Wu | A62B 35/0093 |
| 2018/0126195 | A1 | * | 5/2018 | Lopez | A62B 35/0018 |
| 2018/0161606 | A1 | * | 6/2018 | Quigley | A62B 1/16 |
| 2018/0161607 | A1 | * | 6/2018 | Jacob | A62B 35/04 |
| 2018/0161608 | A1 | * | 6/2018 | Choate | A62B 35/0093 |
| 2018/0333598 | A1 | * | 11/2018 | Hung | A62B 35/0093 |
| 2018/0345049 | A1 | * | 12/2018 | Hung | A62B 35/0075 |
| 2019/0076679 | A1 | * | 3/2019 | Auston | A62B 35/0093 |
| 2019/0083828 | A1 | * | 3/2019 | Sun | A62B 35/0093 |
| 2019/0143158 | A1 | * | 5/2019 | Zimmerman | A62B 1/10 182/231 |
| 2019/0160310 | A1 | * | 5/2019 | Thompson | H04B 1/034 |
| 2019/0209877 | A1 | * | 7/2019 | Farrell | F16D 63/008 |
| 2019/0247683 | A1 | * | 8/2019 | Farrell | F16F 7/12 |
| 2019/0275356 | A1 | * | 9/2019 | Jones | A62B 35/0093 |
| 2020/0023211 | A1 | * | 1/2020 | Chang | A62B 1/10 |
| 2020/0078617 | A1 | * | 3/2020 | Wang | A62B 1/10 |
| 2020/0078618 | A1 | * | 3/2020 | Wang | B65H 75/40 |
| 2020/0078619 | A1 | * | 3/2020 | Wang | A62B 35/0093 |
| 2020/0078620 | A1 | * | 3/2020 | Wang | A62B 35/0093 |
| 2020/0078621 | A1 | * | 3/2020 | Chen | A62B 1/10 |
| 2020/0206550 | A1 | * | 7/2020 | Blackford | A62B 1/10 |
| 2020/0222732 | A1 | * | 7/2020 | Rutkowski | G06K 7/10 |
| 2020/0360740 | A1 | * | 11/2020 | Jones | E04G 21/3204 |
| 2020/0406074 | A1 | * | 12/2020 | Fjelldal | F16F 1/125 |
| 2021/0077840 | A1 | * | 3/2021 | Boraas | A62B 35/04 |
| 2021/0170208 | A1 | * | 6/2021 | Sun | A62B 1/10 |
| 2021/0196996 | A1 | * | 7/2021 | Boraas | A62B 35/0075 |
| 2021/0308502 | A1 | * | 10/2021 | Blackford | A62B 35/0093 |
| 2022/0088425 | A1 | * | 3/2022 | Miller | A62B 35/0075 |

FOREIGN PATENT DOCUMENTS

| | | |
|---|---|---|
| CN | 102887127 A | 1/2013 |
| CN | 203989580 U | 12/2014 |
| WO | 2017078669 A1 | 5/2017 |

OTHER PUBLICATIONS

Civil Engineering Synthetic Materials Test Manual, pp. 86-87, 1991. (relevant for the reasons noted in the English-language translation of the Chinese Office Action).

* cited by examiner

CUT-RESISTANT LEADING EDGE FALL ARREST SYSTEM AND METHOD

CROSS-REFERENCE TO RELATED APPLICATION

This application claims priority to U.S. Provisional Application No. 62/653,995, filed Apr. 6, 2018, the disclosure of which is hereby incorporated by reference in its entirety.

BACKGROUND OF THE DISCLOSURE

Field of the Disclosure

The present disclosure relates generally to fall arrest systems and, in particular, to a fall arrest system and method having a line retraction device, such as a fall arrest/controlled descent device or a self-retracting lanyard having an energy absorber, which may be used in connection with a harness to protect the wearer from a sudden, accelerated fall arrest event, as well as a cut-resistant fall arrest system configured to prevent tearing of a safety line in fall events over a leading edge.

Description of the Related Art

As is known in the art, various fall arrest systems exist to provide assistance to a wearer or ensure the wearer's safety in certain situations. Such fall arrest systems come in many forms, including, but not limited to, line retraction devices used in connection with a harness and an energy absorber. In some embodiments or aspects, one end of a line retraction device is connected to an anchor point and an opposing end is connected to an energy absorber, which is in turn connected to the harness. In other embodiments or aspects, the opposing end of the line retraction device is connected directly to the harness, with the energy absorber device being integrated with the line retraction device or the harness.

In some examples, a line retraction device may be in the form of a lanyard, such as a self-retracting lanyard (SRL). SRLs have numerous industrial end uses, including, but not limited to, construction, manufacturing, hazardous materials/remediation, asbestos abatement, spray painting, sand blasting, welding, mining, numerous oil and gas industry applications, electric and utility, nuclear energy, paper and pulp, sanding, grinding, stage rigging, roofing, scaffolding, telecommunications, automotive repair and assembly, warehousing, and railroading.

In some applications, an SRL is attached at one end to an anchor point and at its other end to an energy absorber that is connected or directly integrated with a harness worn by the user. The SRL has a housing with a rotatable drum having a safety line wound about the drum and a braking mechanism for controlling the rotation of the drum and the resulting unwinding or winding of the safety line from/into the drum. The drum can rotate in a first direction to unwind (or "pay out") the safety line from the housing when a certain level of tension is deliberately applied. When tension is reduced or released, the drum can slowly rotate in a reverse direction, thereby causing the safety line to retract or rewind onto the drum. In this manner, the user can move around the work site without having the safety line dragging behind and impairing the user's movement.

The braking mechanism of the SRL is configured for slowing down and stopping the rotation of the drum when the safety line unwinds too rapidly. For example, the braking mechanism may be activated to brake (i.e., slow down and eventually stop) the rotation of the drum when the rotation speed exceeds a predetermined maximum speed for normal unwinding. A sudden unwinding of the safety line at a speed that exceeds normal payout is an indication that the user has experienced a fall that needs to be stopped or arrested. Should such an unintentional, accidental fall commence, the braking mechanism in the housing of the SRL is configured to engage and stop further unwinding of the safety line, thereby stopping the user from falling any farther.

In addition to the fall arresting action provided by the SRL, the energy absorber is configured to activate when the force on the safety line between the SRL and the harness exceeds a predetermined threshold to arrest the fall slowly enough to prevent injury to the user. The stopping force provided by the SRL brake and the energy absorber is inversely proportional to the stopping distance, i.e., the higher the force, the shorter the distance, and vice versa. As a result, the force cannot exceed a predetermined maximum (set by an industry standard), and yet it must also be large enough so that the stopping distance does not exceed a predetermined maximum (also set by an industry standard).

Many falls occur over an edge of a working surface, causing the safety line of the SRL to bend over a leading edge. In such situations, if the energy absorber is not positioned between the user and the leading edge, there is a risk that the user will be exposed to dangerously high forces caused by a sudden deceleration of the user's body as the user's weight is supported by the harness and the safety line attaching the user to the anchor point. In extreme cases, the force on the safety line may exceed the tensile strength of the safety line, causing the safety line to break. For example, this may occur because the safety line is being bent or deformed around the leading edge.

Accordingly, there is a need in the art for an improved fall arrest system that addresses certain drawbacks and deficiencies associated with existing fall arrest systems. For example, there is a need for an improved fall arrest system to prevent tearing of the safety line in case of a fall event over a leading edge. There is also a need for an improved fall arrest system with increased safety compliance at the worksite, and with more effective and safe support of the user in the event of a fall.

SUMMARY OF THE DISCLOSURE

Generally, provided is an improved fall arrest system having a self-retracting lanyard and an energy absorbing element for use with a harness worn by a user. Preferably, provided is an improved fall arrest system having a self-retracting lanyard and an energy absorbing element with a cut-resistant, flat webbing material for use with the SRL to prevent tearing of the safety line in a fall event over the leading edge. Preferably, provided is an improved fall arrest system that leads to increased safety compliance at the worksite, and provides increased safety of the user in the event of a fall.

In some non-limiting embodiments or aspects, provided is a fall arrest system with a line retraction device configured for connecting to an anchoring point, the line retraction device having a safety line. The fall arrest system may further have an energy absorber configured for connecting to a terminal end of the safety line, and a harness configured for connecting to the energy absorber such that the energy absorber is disposed between the terminal end of the safety line and the harness. The safety line may be selected to have a predetermined mean breaking force with a first standard deviation, and the energy absorber may be selected to have a predetermined mean deployment force with a second standard deviation. The mean breaking force of the safety line and the mean deployment force of the energy absorber may overlap over an overlapping region of the first and second standard deviation. A ratio of an overlap mean force of the overlapping region to an overlap standard deviation of the overlapping region may be less than or equal to 6.

In some non-limiting embodiments or aspects, the overlap mean force may be based on a difference between the mean breaking force of the safety line and the mean deployment force of the energy absorber. The overlap standard deviation may be based on sum of squares of the first and second standard deviations. A normal distribution of the overlap mean force and the overlap standard deviation may be greater than zero.

In some non-limiting embodiments or aspects, the safety line may be made from a flat webbing material. The flat webbing material may be a woven material. The energy absorber may be a tear tape having two load-bearing webbing components woven together by binder threads. The energy absorber may be a tear tape having two load-bearing webbing adhesively connected together.

In some non-limiting embodiments or aspects, the line retraction device may be a self-retracting lanyard. The safety line may be wound within a housing of the line retraction device whereby the safety line is configured to be unwound from the housing when a tension force applied to a first end of the safety line is above a predetermined threshold, and wherein the safety line is configured to be rewound into the housing when the tension force applied to the first end of the safety line is above the predetermined threshold.

In some non-limiting embodiments or aspects, a method for determining a minimum load handling requirement for components of a fall arrest system may include providing the fall arrest system having a safety line and an energy absorber, determining a mean breaking force of the safety line and a standard deviation of the mean breaking force, determining a mean deployment force of the energy absorber and a standard deviation of the mean deployment force, determining an overlap mean force based on the mean breaking force and the mean deployment force, determining an overlap standard deviation based on the standard deviation of the mean breaking force and the standard deviation of the mean deployment force, and determining a ratio between the overlap mean force and the overlap standard deviation.

In some non-limiting embodiments or aspects, the ratio may be less than or equal to 6. The overlap mean force may be based on a difference between the mean breaking force of the safety line and the mean deployment force of the energy absorber. The overlap standard deviation may be based on sum of squares of the first and second standard deviations. A normal distribution of the overlap mean force and the overlap standard deviation may be greater than zero.

In some non-limiting embodiments or aspects, the safety line may be made from a flat webbing material. The flat webbing material may be a woven material. The energy absorber may be a tear tape having two load-bearing webbing components woven together by binder threads. The energy absorber may be a tear tape having two load-bearing webbing adhesively connected together.

In some non-limiting embodiments or aspects, the line retraction device may be a self-retracting lanyard. The safety line may be wound within a housing of the line retraction device whereby the safety line is configured to be unwound from the housing when a tension force applied to a first end of the safety line is above a predetermined threshold, and wherein the safety line is configured to be rewound into the housing when the tension force applied to the first end of the safety line is above the predetermined threshold.

In some non-limiting embodiments or aspects, the fall arrest system and method can be characterized by one or more of the following clauses:

Clause 1. A fall arrest system comprising: a line retraction device configured for connecting to an anchoring point, the line retraction device having a safety line; an energy absorber configured for connecting to a terminal end of the safety line; and a harness configured for connecting to the energy absorber such that the energy absorber is disposed between the terminal end of the safety line and the harness, wherein the safety line is selected to have a predetermined mean breaking force with a first standard deviation, wherein the energy absorber is selected to have a predetermined mean deployment force with a second standard deviation, wherein the mean breaking force of the safety line and the mean deployment force of the energy absorber overlap over an overlapping region of the first and second standard deviation, and wherein a ratio of an overlap mean force of the overlapping region to an overlap standard deviation of the overlapping region is less than or equal to 6.

Clause 2. The fall arrest system according to clause 1, wherein the overlap mean force is based on a difference between the mean breaking force of the safety line and the mean deployment force of the energy absorber.

Clause 3. The fall arrest system according to clause 1 or 2, wherein the overlap standard deviation is based on sum of squares of the first and second standard deviations.

Clause 4. The fall arrest system according to any of clauses 1-3, wherein a normal distribution of the overlap mean force and the overlap standard deviation is greater than zero.

Clause 5. The fall arrest system according to any of clauses 1-4, wherein the safety line is made from a flat webbing material.

Clause 6. The fall arrest system according to any of clauses 1-5, wherein the flat webbing material is a woven material.

Clause 7. The fall arrest system according to any of clauses 1-6, wherein the energy absorber is a tear tape having two load-bearing webbing components woven together by binder threads.

Clause 8. The fall arrest system according to any of clauses 1-7, wherein the energy absorber is a tear tape having two load-bearing webbing adhesively connected together.

Clause 9. The fall arrest system according to any of clauses 1-8, wherein the line retraction device is a self-retracting lanyard.

Clause 10. The fall arrest system according to any of clauses 1-9, wherein the safety line is wound within a housing of the line retraction device whereby the safety line is configured to be unwound from the housing when a tension force applied to a first end of the safety line is above a predetermined threshold, and wherein the safety line is configured to be rewound into the housing when the tension force applied to the first end of the safety line is above the predetermined threshold.

Clause 11. A method for determining a minimum load handling requirement for components of a fall arrest system, the method comprising: providing the fall arrest system having a safety line and an energy absorber; determining a mean breaking force of the safety line and a standard deviation of the mean breaking force; determining a mean deployment force of the energy absorber and a standard deviation of the mean deployment force; determining an overlap mean force based on the mean breaking force and the mean deployment force; determining an overlap standard deviation based on the standard deviation of the mean breaking force and the standard deviation of the mean deployment force; and determining a ratio between the overlap mean force and the overlap standard deviation.

Clause 12. The method according to clause 11, wherein the ratio is less than or equal to 6.

Clause 13. The method according to clause 11 or 12, wherein the overlap mean force is based on a difference between the mean breaking force of the safety line and the mean deployment force of the energy absorber.

Clause 14. The method according to any of clauses 11-13, wherein the overlap standard deviation is based on sum of squares of the first and second standard deviations.

Clause 15. The method according to any of clauses 11-14, wherein a normal distribution of the overlap mean force and the overlap standard deviation is greater than zero.

Clause 16. The method according to any of clauses 11-15, wherein the safety line is made from a flat webbing material.

Clause 17. The method according to any of clauses 11-16, wherein the energy absorber is a tear tape having two load-bearing webbing components woven together by binder threads.

Clause 18. The method according to any of clauses 11-17, wherein the energy absorber is a tear tape having two load-bearing webbing adhesively connected together.

Clause 19. The method according to any of clauses 11-18, wherein the line retraction device is a self-retracting lanyard.

Clause 20. The method according to any of clauses 11-19, wherein the safety line is wound within a housing of the line retraction device whereby the safety line is configured to be unwound from the housing when a tension force applied to a first end of the safety line is above a predetermined threshold, and wherein the safety line is configured to be rewound into the housing when the tension force applied to the first end of the safety line is above the predetermined threshold.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure.

BRIEF DESCRIPTION OF THE DRAWINGS

In FIGS. 1-9, like reference numerals refer to like elements, unless noted otherwise.

DETAILED DESCRIPTION OF THE PREFERRED EMBODIMENTS

Figure 1A:
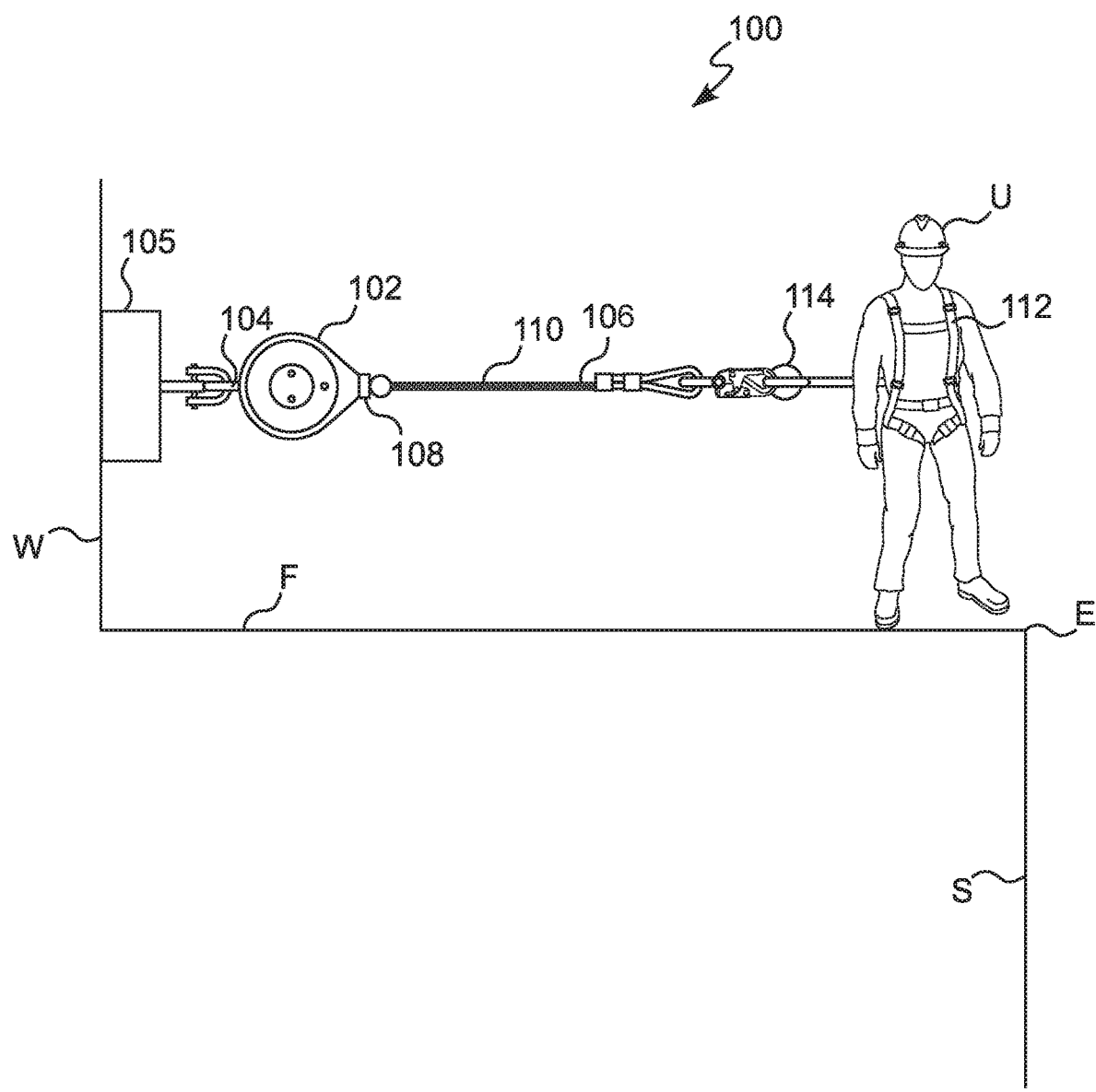
FIG. 1A is a schematic representation of a fall arrest system in accordance with some non-limiting embodiments or aspects of the present disclosure.

As used herein, the singular form of "a", "an", and "the" include plural referents unless the context clearly dictates otherwise.

Spatial or directional terms, such as "left", "right", "inner", "outer", "above", "below", and the like, relate to the disclosure as shown in the drawing figures and are not to be considered as limiting as the disclosure can assume various alternative orientations.

All numbers and ranges used in the specification and claims are to be understood as being modified in all instances by the term "about". By "about" is meant to be plus or minus twenty-five percent of the stated value, such as plus or minus ten percent of the stated value. However, this should not be considered as limiting to any analysis of the values under the doctrine of equivalents.

Unless otherwise indicated, all ranges or ratios disclosed herein are to be understood to encompass the beginning and ending values and any and all subranges or subratios subsumed therein. For example, a stated range or ratio of "1 to 10" should be considered to include any and all subranges or subratios between (and inclusive of) the minimum value of 1 and the maximum value of 10; that is, all subranges or subratios beginning with a minimum value of 1 or more and ending with a maximum value of 10 or less. The ranges and/or ratios disclosed herein represent the average values over the specified range and/or ratio.

The terms "first", "second", and the like are not intended to refer to any particular order or chronology, but refer to different conditions, properties, or elements.

The term "at least" is synonymous with "greater than or equal to".

The term "not greater than" is synonymous with "less than or equal to".

As used herein, the term "at least one of" is synonymous with "one or more of". For example, the phrase "at least one of A, B, and C" means any one of A, B, and C, or any combination of any two or more of A, B, and C. For example, "at least one of A, B, and C" includes one or more of A alone; or one or more B alone; or one or more of C alone; or one or more of A and one or more of B; or one or more of A and one or more of C; or one or more of B and one or more of C; or one or more of all of A, B, and C. Similarly, as used herein, the term "at least two of" is synonymous with "two or more of". For example, the phrase "at least two of D, E, and F" means any combination of any two or more of D, E, and F. For example, "at least two of D, E, and F" includes one or more of D and one or more of E; or one or more of D and one or more of F; or one or more of E and one or more of F; or one or more of all of D, E, and F.

The term "includes" is synonymous with "comprises".

As used herein, the terms "parallel" or "substantially parallel" mean a relative angle as between two objects (if extended to theoretical intersection), such as elongated objects and including reference lines, that is from 0° to 5°, or from 0° to 3°, or from 0° to 2°, or from 0° to 1°, or from 0° to 0.5°, or from 0° to 0.25°, or from 0° to 0.1°, inclusive of the recited values.

As used herein, the terms "perpendicular" or "substantially perpendicular" mean a relative angle as between two objects at their real or theoretical intersection is from 85° to 90°, or from 87° to 90°, or from 88° to 90°, or from 89° to 90°, or from 89.5° to 90°, or from 89.75° to 90°, or from 89.9° to 90°, inclusive of the recited values.

The discussion of the disclosure may describe certain features as being "particularly" or "preferably" within certain limitations (e.g., "preferably", "more preferably", or "even more preferably", within certain limitations). It is to be understood that the disclosure is not limited to these particular or preferred limitations but encompasses the entire scope of the disclosure.

It is also to be understood that the specific devices and processes illustrated in the attached drawings and described in the following specification are simply exemplary aspects of the disclosure. Hence, specific dimensions and other physical characteristics related to the examples disclosed herein are not to be considered as limiting.

With initial reference to FIG. 1A, a fall arrest system 100 is illustrated in accordance with one non-limiting embodiment or aspect of the present disclosure. The fall arrest system 100 includes a line retraction device 102 connected at its first end 104 to an anchoring point 105 on a structure S. In some non-limiting embodiments or examples, the line retraction device 102 may be a SRL. The first end 104 of the line retraction device 102 may be directly attached to the anchoring point 105 without any intermediate component between the first end 104 of the line retraction device 102 and the anchoring point 105. In some non-limiting embodiments or aspects, the first end 104 of the line retraction device 102 may be attached to a first end of a line (not shown) having its second end attached to the anchoring point 105.

The line retraction device 102 has a safety line 110 that is wound within a housing of the line retraction device 102. The safety line 110 is unwound or paid out from a second end 108 of the line retraction device 102. The safety line 110 is connected at its terminal end 106 to a safety harness 112 worn by a user U. In some examples, an energy absorber 114 is disposed between the user U and the line retraction device 102. For example, the energy absorber 114 may be a tear tape element disposed between the safety harness 112 and the terminal end 106 of the safety line 110. In some non-limiting embodiments or aspects, the tear tape element may have two load-bearing webbing components that are woven together by binder threads or adhesively connected together to constitute a single-piece webbing material. In other non-limiting embodiments or aspects, the energy absorber 114 may be directly integrated with the safety harness 112, such as disclosed in U.S. application Ser. No. 15/376,233 titled "Harness With Integrated Energy Absorber" or U.S. application Ser. No. 15/376,191 titled "Harness With Structural Tear Tape", the disclosures of which are directly incorporated herein by reference in their entirety.

FIG. 1A illustrates the user U positioned at near a leading edge E of the structure S. In many applications, the structure S is often at the highest point of a construction project, so there is typically no suitable overhead anchoring point 105. Thus, the user U is tethered to a horizontal anchoring point 105, such as on the floor F, or a substantially horizontal anchoring point, such as on a wall W of the structure S.

With continued reference to FIG. 1A, the safety line 110 is configured to be unwound (paid out) from the line retraction device 102 when a certain level of tension is applied to the safety line 110, such as during movement of the user U on the structure S. When such tension is reduced or released, the line retraction device 102 can slowly rotate in a reverse direction, thereby causing the safety line 110 to retract or rewind into the line retraction device 102.

Figure 1B:
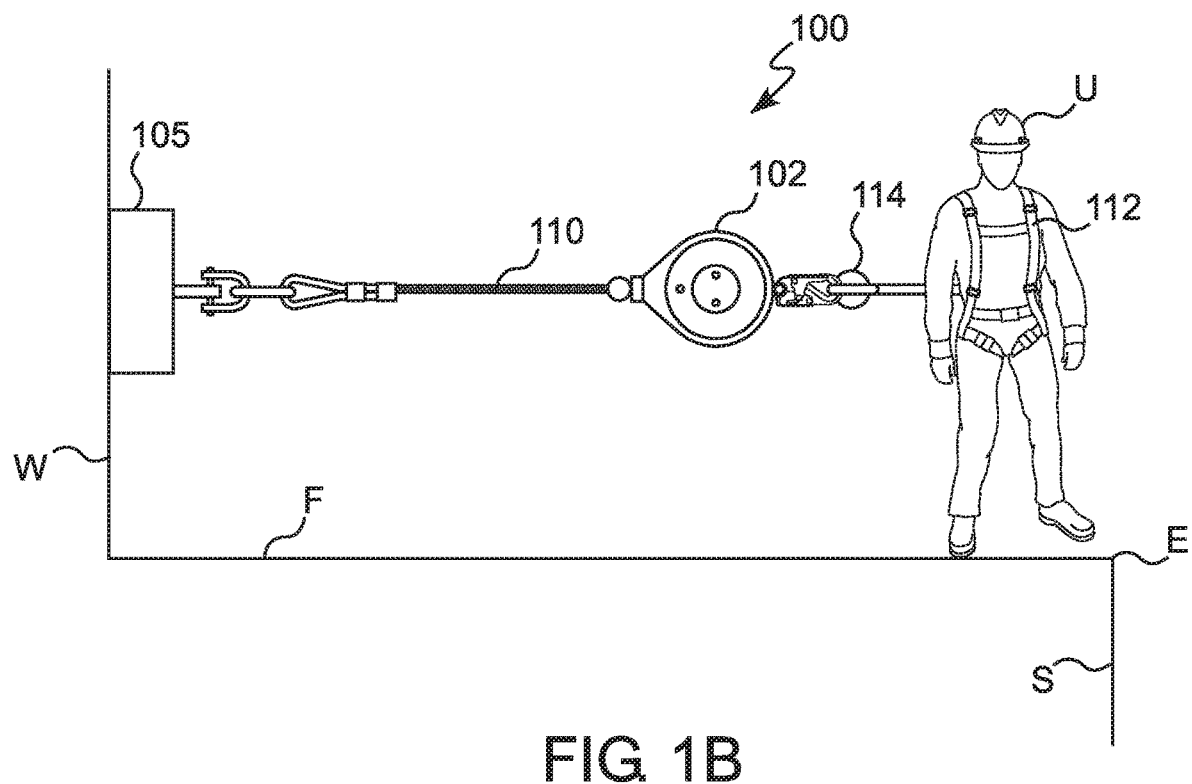
FIG. 1B is a schematic representation of a fall arrest system in accordance with some non-limiting embodiments or aspects of the present disclosure.
Figure 1C:
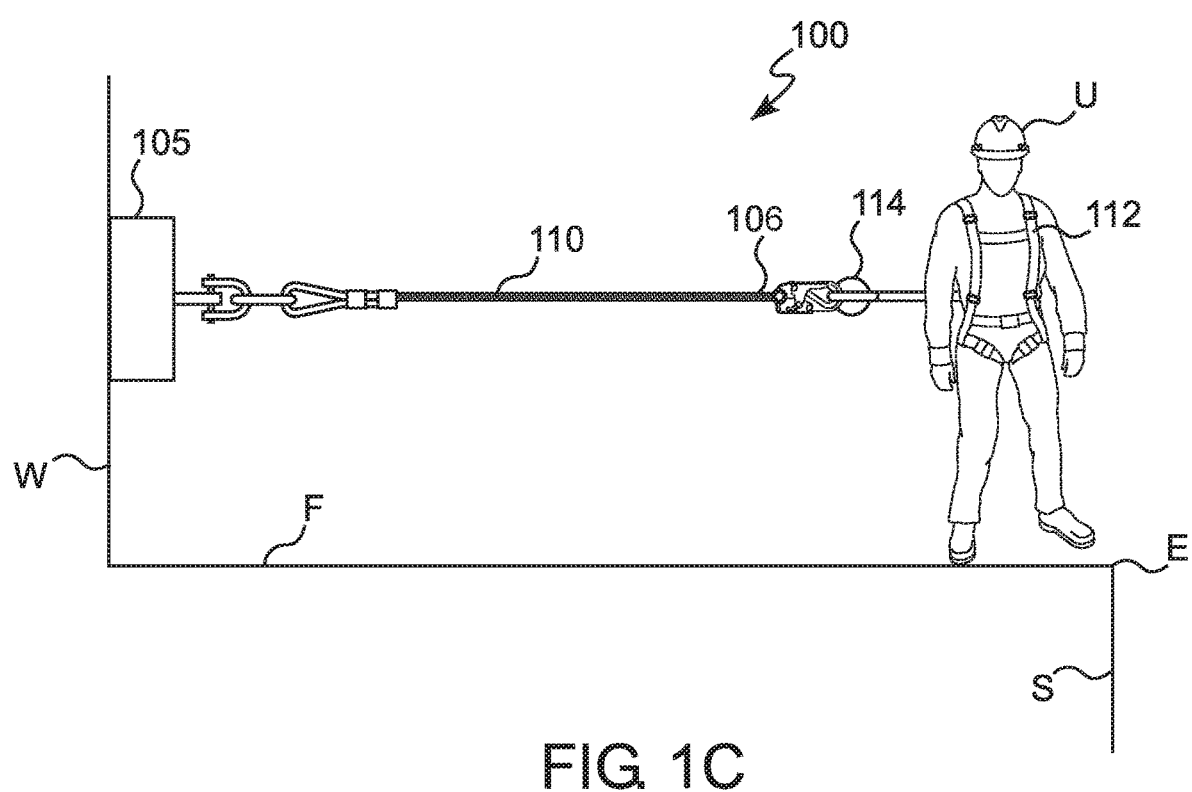
FIG. 1C is a schematic representation of a fall arrest system in accordance with some non-limiting embodiments or aspects of the present disclosure.

While FIG. 1A shows an embodiment or aspect of the fall arrest system 100 wherein the line retraction device 102 is directly attached to the anchoring point 105, in some non-limiting embodiments or aspects of the fall arrest system 100, the safety line 110 may be attached to the anchoring point 105 at one end, while the line retraction device 102 and the energy absorber 114 are connected to the terminal end 106 of the safety line 110 (FIG. 1B). In such an arrangement, the line retraction device 102 and the energy absorber 114 are proximate to the harness 112 or directly attached to the harness 112. In further non-limiting embodiments or examples of the fall arrest system 100, the safety line 110 may be directly connected to the energy absorber 114 without the line retraction device 102 (FIG. 1C).

Figure 2:
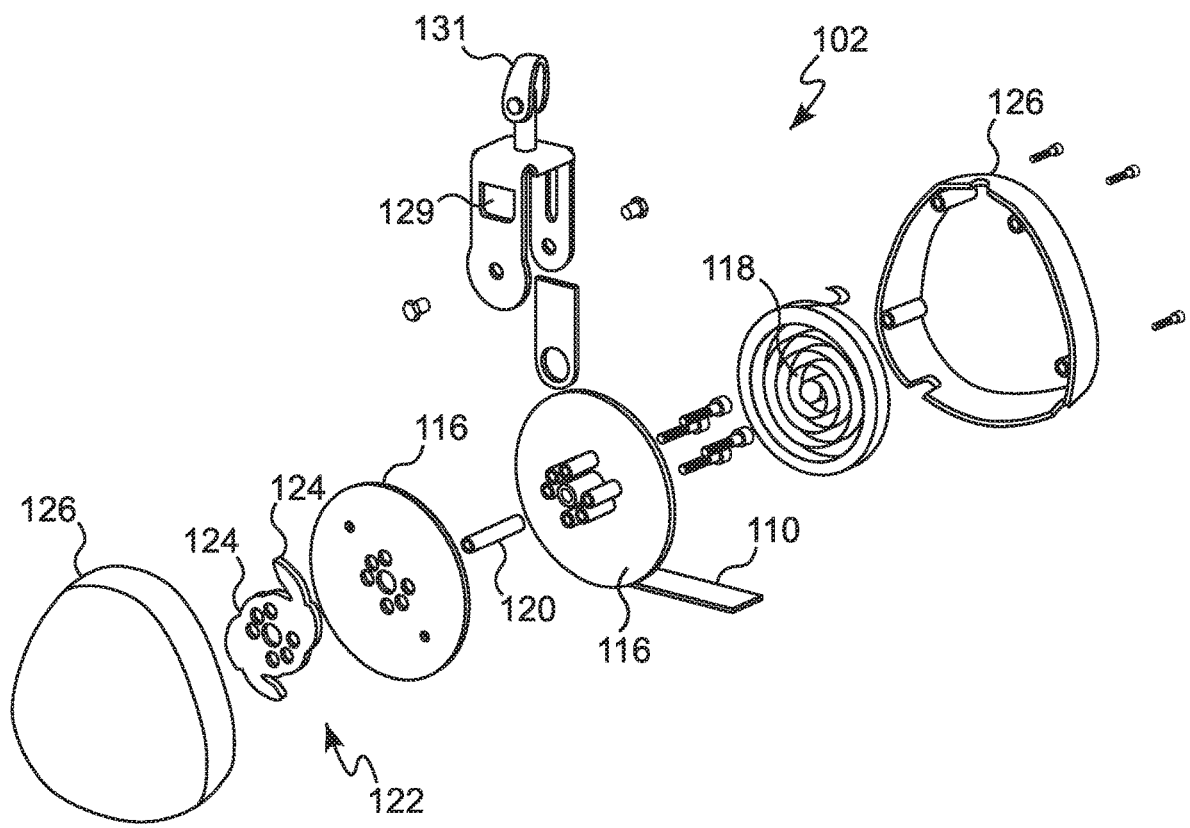
FIG. 2 is an exploded perspective view of a line retraction device for use with a fall arrest system in accordance with some non-limiting embodiments or aspects of the present disclosure.

With reference to FIG. 2, and in some non-limiting embodiments or aspects, the line retraction device 102 is a SRL that includes a drum 116 rotatable about a shaft 120 and having the safety line 110 wound thereon. The line retraction device 102 further has a retraction member 118 biasing the drum 116 in a first rotational direction of the drum 116. In some non-limiting embodiments or aspects, the retraction member 118 is a coiled spring. The drum 116 is configured to (i) retract or rewind the safety line 110 when the drum 116 moves in the first rotational direction (such as a clockwise direction or a counterclockwise direction), and (ii) pay out or unwind the safety line 110 when the drum 116 moves in the second rotational direction opposite the first rotational direction. In some non-limiting embodiments or aspects, a damper assembly may be provided to provide rotational resistance to the drum 116 in at least one of (i) the first rotational direction of the drum 116 as the safety line 110 is being retracted, and (ii) the second rotational direction of the drum 116 as the safety line 110 is being paid out.

With continued reference to FIG. 2, the line retraction device 102 further includes a brake assembly 122 having at least one pawl 124. The brake assembly 122 is configured to prevent rotation of the drum 116 upon activation of the brake assembly 122 when the rotational velocity of the drum 116 exceeds a predetermined threshold. In some non-limiting embodiments or aspects, the predetermined threshold may be set by an industry standard. The at least one pawl 124 of the brake assembly 122 functions as a speed-sensitive mechanism operative between an activated position and a non-activated position. The at least one pawl 124 is configured to transition from the non-activated position to the activated position at a predetermined rotation speed of the drum 116. The predetermined rotation speed of the drum 116 that transitions the pawl 124 from the non-activated position to the activation position is a known range of rotation speed that is indicative of a fall event. The safety line 110 is configured pay out from the drum 116 during a fall event and causes the at least one pawl 124 to move radially outward into engagement with the corresponding teeth on a bracket 129 which may be attached to a housing 126 of the line retraction device 102. The at least one pawl 124 may be biased radially inward via springs or any other suitable biasing arrangement (not shown). The centrifugal force on the at least one pawl 124 during rapid pay out of the safety line 110 overcomes the biasing force such that the at least one pawl 124 moves radially outward and into engagement with the teeth on the housing 126, thereby stopping further pay out of the safety line 110.

With continued reference to FIG. 2, the housing 126 has the bracket 129 connected thereto with an attachment point 131 for the energy absorber 114 (shown in FIG. 1) or the safety harness 112 (shown in FIG. 1).

Figure 3:
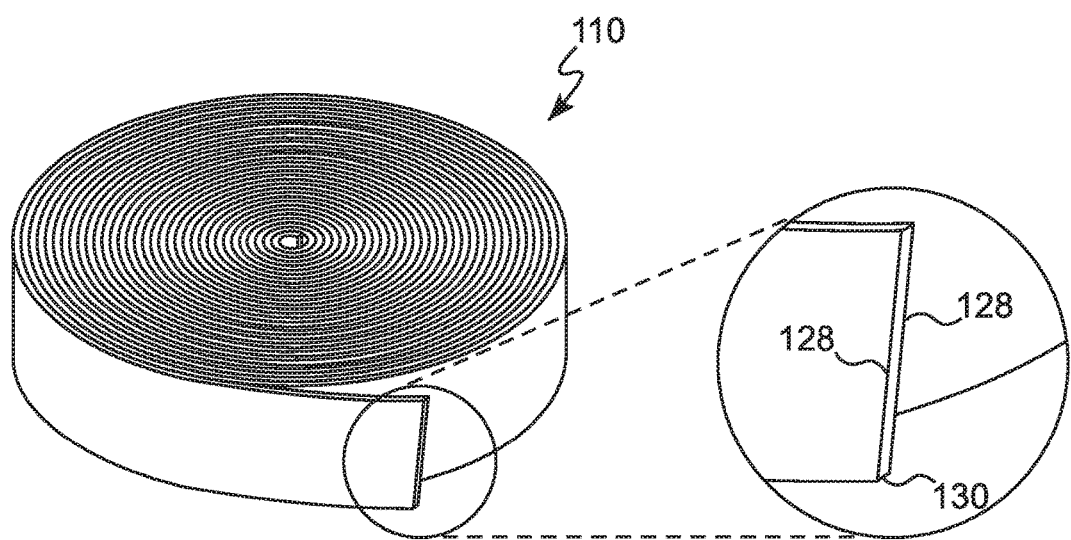
FIG. 3 is a perspective view of a webbing material for use with the line retraction device shown in FIG. 2.

With reference to FIG. 3, and in some non-limiting embodiments or aspects, the safety line 110 of the line retraction device 102 is configured as flat webbing. Such flat webbing may be configured to have sufficient strength to effectively catch and hold the weight of the user U during a fall event. Such flat webbing may be further configured to resist breakage or severing (i.e., be cut-resistant) when engaged with the leading edge E of the structure S. In some non-limiting embodiments or aspects, the webbing of the safety line 110 may be formed from a flat, woven material. In other non-limiting embodiments or aspects, the webbing of the safety line 110 may be formed from a flat, woven, non-metallic material to reduce the weight of the safety line 110.

With continued reference to FIG. 3, the webbing of the safety line 110 may have first and second major lateral surfaces 128 separated by first and second minor lateral surfaces 130 such that the safety line 110 is substantially belt-shaped. The safety line 110 may have a rectangular cross-section. In some non-limiting embodiments or aspects, the first and second major lateral surfaces 128 may be substantially flat or curved. In some non-limiting embodiments or aspects, the first and second minor lateral surfaces 130 may be substantially flat or curved. The belt-shaped safety line 110 allows for auto-stacking of the safety line 110 on the drum 116. In some non-limiting embodiments or aspects, at least a portion of the webbing of the safety line 110 may be encased within a sleeve (not shown).

When designing a fall arrest system 100 comprising a line retraction device 102 and an energy absorber 114, the overall load handling requirement can be determined as a function of a breaking strength of the safety line 110 of the line retraction device 102 and the maximum force that can be absorbed by the energy absorber 114 during its deployment. For example, if the safety line 110 has a higher breaking strength than the energy absorber 114, the fall arrest system 100 must be designed such that the energy absorber 114 is capable of withstanding the load imposed thereon during the fall event. In other words, if the maximum deployment force of the energy absorber 114 is the "weakest link" in the chain of the fall arrest system 100 between the anchoring point 105 and the user, then the energy absorber 114 must be specified to have sufficient strength to handle the load during a fall event without breaking. Similarly, if the strength of the safety line 110 is the "weakest link", the safety line 110 must be specified to have sufficient strength to handle the load during a fall event without breaking. In leading edge applications, where the safety line 110 folds over a leading edge E after a fall event, the safety line 110 may be exposed to additional forces due to sliding of the safety line 110 along the leading edge E, as described herein.

While the possibility of breaking of the safety line 110 and/or the energy absorber 114 as a result of a fall event can be addressed by over-specifying the components of the fall arrest system 100, such as by using a thick safety line 110 with a load rating that substantially exceeds any force that the safety line 110 may be subjected to during a fall event, such practice results in a fall arrest system 100 with bulky and heavy components that may impair the user's ability to freely move about the structure S during normal work activities. In addition, the cost of such a fall arrest 100 increases substantially. The following discussion provides a practical application for determining a minimum load handling requirement for components of a load handling system based on a desired specification limit. In particular, such a load handling requirement can be expressed as a non-dimensional ratio based on a ratio between a mean force value for a region where the strength of the safety line 110 and the deployment force of the energy absorber 114 overlap and a standard deviation of the mean force. It is desirable to design a fall arrest system 100 with components that have a low probability of failing as a result of stresses imposed thereon during a fall event. Such probability can be expressed in terms of a non-dimensional factor, as discussed herein. FIGS. 4-9 show an experimental setup and test results for optimizing the strength of the fall arrest system 100 handle fall events over the leading edge E without failure of the safety line 110 or the energy absorber 114.

Figure 4:
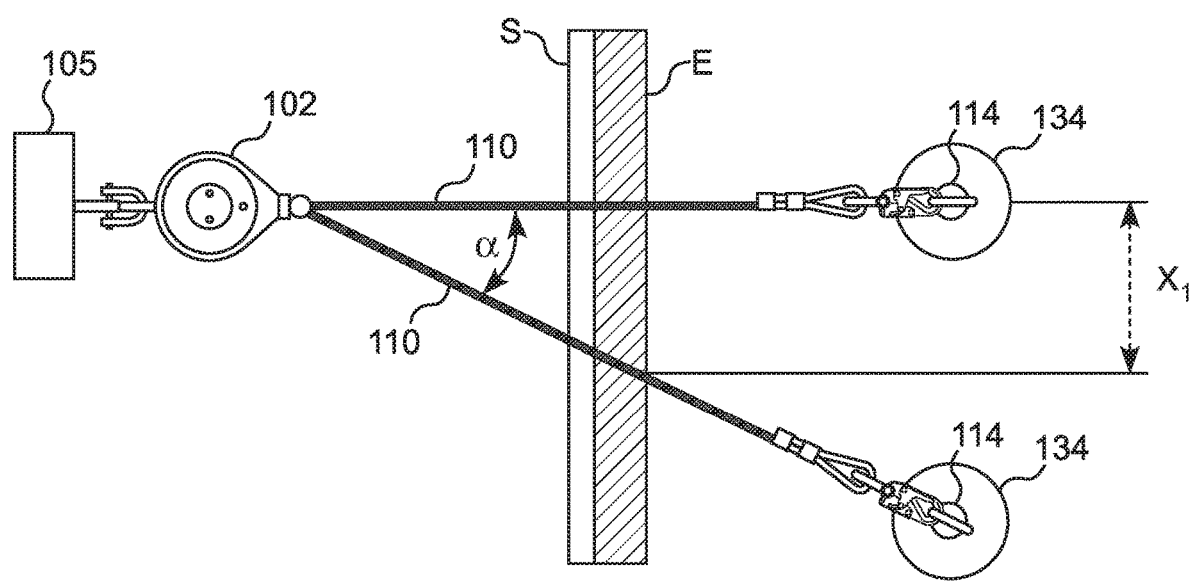
FIG. 4 is a top view of an experimental setup of a fall arrest system configured for measuring forces in a fall event over a leading edge in accordance with some non-limiting embodiments or aspects of the present disclosure.

With reference to FIG. 4, to determine the forces that the safety line 110 and energy absorber 114 must withstand when used in a fall safety system 100 in a leading edge application, experimental data was collected for two different fall event scenarios. FIG. 4 shows a top view of an experimental setup where the safety line 110 breaks over the leading edge E at different angles. In a first fall event scenario ("perpendicular test"), the line retraction device 102 was secured to the anchoring point 105 and a test load 134 corresponding to a weight of a user (310 lbs (141 kg)) was dropped over the leading edge E with the safety line 110 oriented substantially perpendicular to the leading edge E. In a second fall event scenario ("offset test"), the line retraction device 102 was secured to the anchoring point 105 and a test load 134 corresponding to a weight of a user was dropped over the leading edge E with the safety line 110 offset at angle α relative to the leading edge E, wherein angle α is an acute angle. A distance $X_1$, as measured in a direction along the leading edge E between the breakover of the safety line 110 over the leading edge E in the perpendicular test and the offset test was set to approximately 60 in (1.52 m). In both cases, the safety line 110 was connected to the test load 134 by way of the energy absorber 114.

Figure 5A:
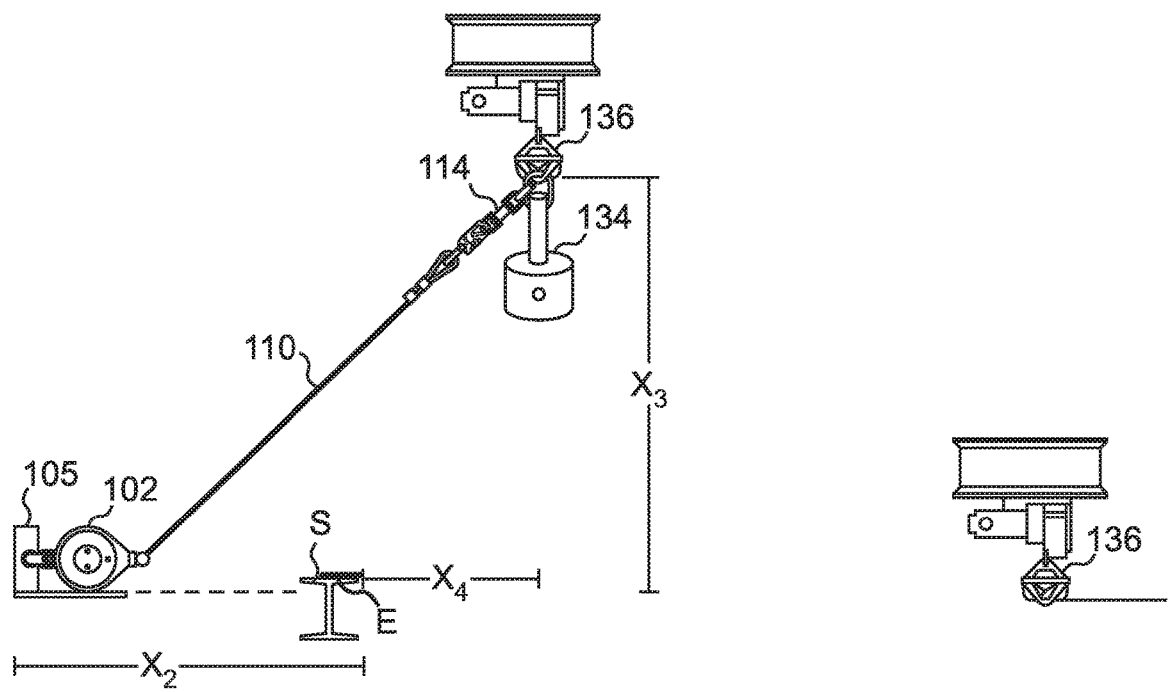
FIG. 5A is a side view of the fall arrest system shown in FIG. 4 in a first configuration prior to a fall event.
Figure 5B:
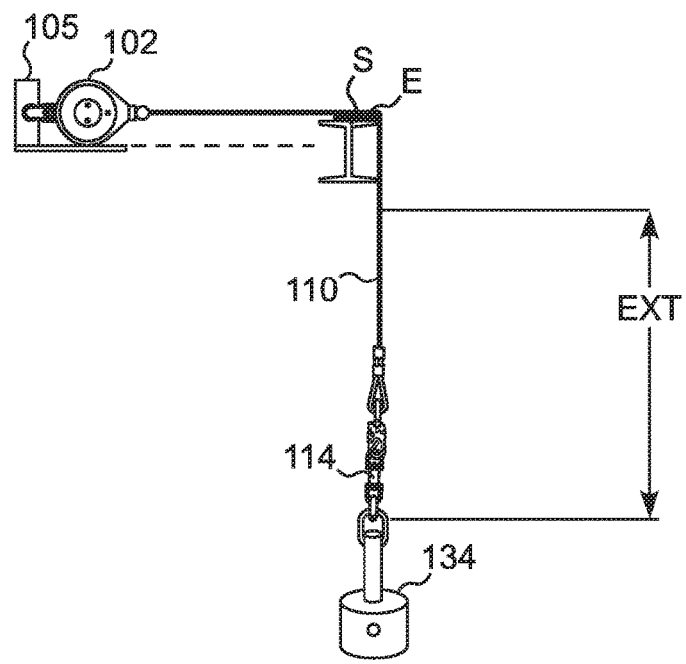
FIG. 5B is a side view of the fall arrest system shown in FIG. 4 in a second configuration after a fall event.

With reference to FIGS. 5A-5B, a side view of the experimental setup of FIG. 4 is shown with the test load 134 in a raised position (FIG. 5A) above the leading edge E prior to the drop test and a lowered position (FIG. 5B) below the leading edge E after the drop test. As shown in FIG. 5B, the safety line 110 is folded over the leading edge E in the lowered position of the test load 134 after the drop test. This position simulates a user that has fallen over the leading edge E and is suspended by the safety line 110 and the energy absorber 114.

With reference to FIG. 5A, the anchoring point 105 was positioned at a distance $X_2$ from the leading edge E. Distance $X_2$ was set at approximately 74 in (2.5 m). The test load 134 was suspended at a distance $X_3$ above the leading edge E at an attachment point 136. Distance $X_3$ was set at approximately 60 in (1.52 m). The test load 134 was also positioned at a distance $X_4$ away from the leading edge E. Distance $X_4$ was set at approximately 20 in (0.51 m). For the offset test, the test load 134 was positioned such that the intersection point between the safety line 110 and the leading edge E was offset approximately 60 in (1.52 m) relative to the perpendicular test where the safety line 110 was substantially perpendicular to the leading edge E.

With reference to FIG. 5A, the test load 134 was then dropped from the attachment point 136, allowing the energy absorber 114 to be deployed and the safety line 110 to be folded over the leading edge E. The total freefall for the perpendicular test was found to be approximately 94.5 in (2.4 m), while the total freefall of the test weight 134 for the offset test was found to be approximately 96 in (2.44 m). After both test scenarios, a residual static strength test was conducted where the safety line 110 and the energy absorber 114 were loaded with at least 1,000 lbf (4,448 N). In order to obtain $x_L$ and $\sigma_L$, which will be described below, the energy absorber 114 was removed from the test.

A total energy absorption requirement for the fall arrest system 100 can be determined based on the total freefall distance, the known weight of the user, and the average deployment force for the energy absorber 114. In particular, the total energy absorption requirements can be calculated by the following formula, where "ext" represents the vertical distance over which the load is to be absorbed:

$$ext = \frac{W * h}{Favg - W}$$

where W is the weight of the user (mass multiplied by gravity), h is the total freefall distance (94.5 in (2.4 m) for the perpendicular test and 96 in (2.44 m) for the offset test), and $F_{avg}$ is a known energy absorber 114 deployment force.

While the above formula represents theoretical energy absorption requirement of the fall arrest system 100, actual energy absorption requirement is also a function of the angle of the safety line 110 relative to the leading edge E. In offset fall scenarios, where the safety line 110 is positioned at a non-perpendicular angle relative to the leading edge E, the safety line 110 may slide along the leading edge E after the user falls. For example, the safety line 110 may have a tendency to slide along the leading edge E towards the perpendicular orientation where the safety line 110 makes a perpendicular angle with the leading edge E. In such fall scenarios, the sliding of the safety line 110 along the leading edge E from an offset to a perpendicular orientation may subject the user to additional forces beyond those of the energy absorber 114 as it absorbs the initial fall. For example, and with reference to FIG. 6, a force trace graph shows a force on the safety line 110 as a function of time for the offset drop test.

Figure 6:
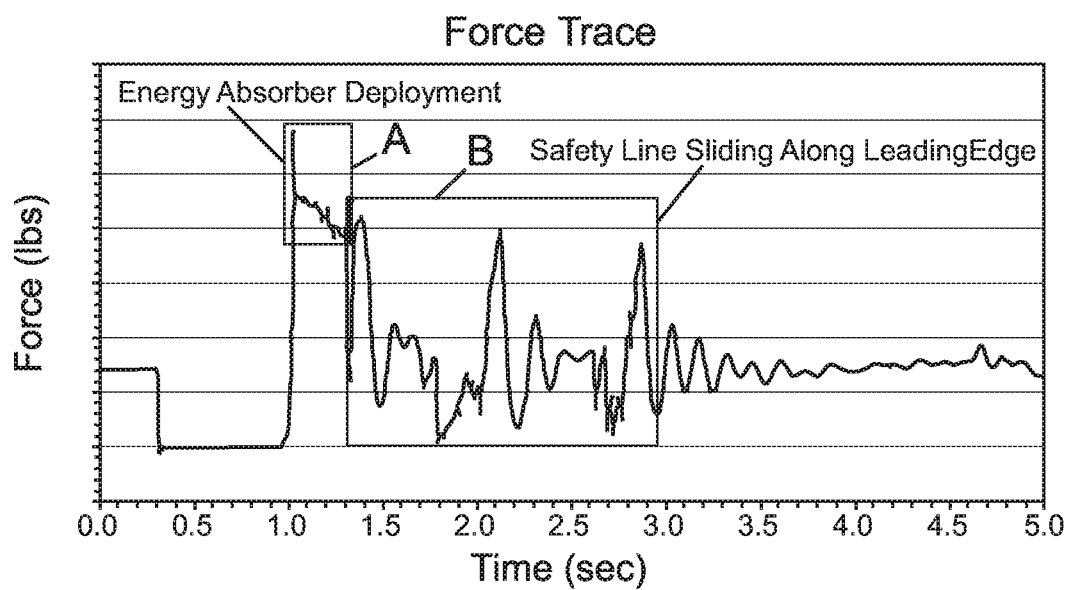
FIG. 6 is a force trace graph showing a force on an energy absorber and a safety line of a fall arrest system as a function of time.

FIG. 6 shows that the force trace during an offset test can be broken into two distinct events—a first phase event A comprising a dynamic impact where the energy absorber 114 is activated, and a second phase event B comprising sliding of the safety line 110 along the leading edge E in a direction toward a perpendicular orientation. In the first phase event A, the energy absorber 114 is deployed with a uniform force trace having an initial spike that is gradually reduced in a uniform manner (i.e., a slope of the force curve is linear). During this first phase event A, the force on the safety line 110 is the same regardless of angular orientation of the safety line 110 relative to the leading edge E. However, in the second phase event B, the safety line 110 is subjected to a series of loads as the line slides along the leading edge E toward the perpendicular orientation. Due to this movement of the safety line 110, there is a risk that that safety line 110 may be cut or abraded via frictional contact with the leading edge E. Thus, the overall force requirement must be configured to resist cutting/abrasion during sliding toward the perpendicular orientation.

Figure 7:
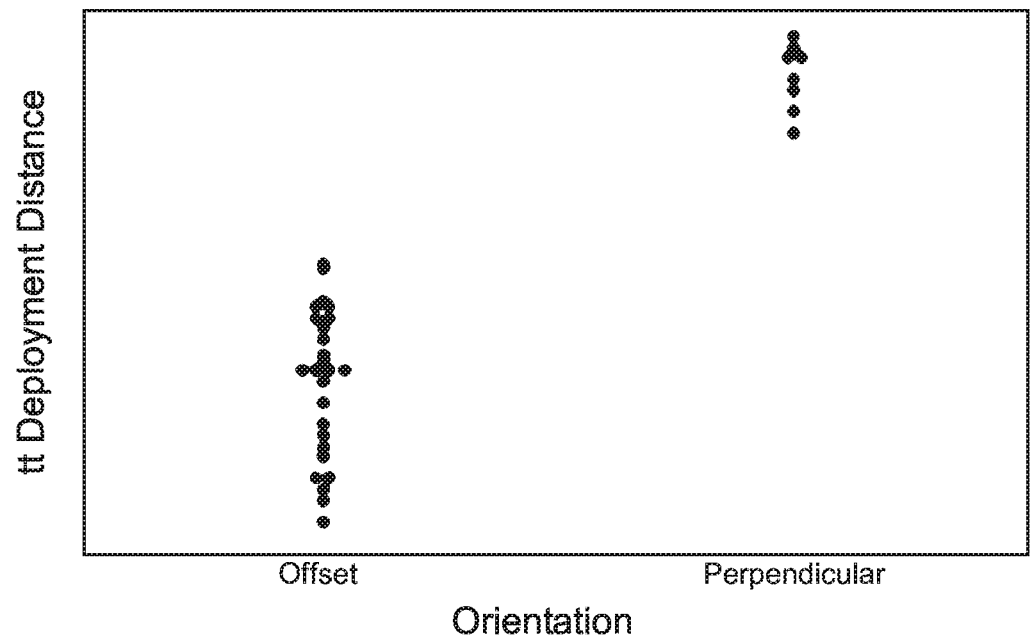
FIG. 7 is a graph of energy absorber deployment for two different test scenarios simulating a fall event over a leading edge.

FIG. 7 is a graph of energy absorber 114 deployment for the perpendicular and offset tests simulating a fall event over the leading edge E. The offset test requires less tear tape deployment from the energy absorber 114 than the perpendicular test. Because the safety line 110 is sliding along the leading edge E and the test load 134 is swinging radially around the contact point on the leading edge E, the system absorbs energy and the energy absorber 114 is not required to exclusively absorb all of the energy of a fall.

In most fall arrest systems, the breaking strength of the safety line 110 typically exceeds the maximum force ($F_{max}$) that is experienced by the energy absorber 114 during its deployment. If the strength of the safety line 110 substantially exceeds the $F_{max}$ of the energy absorber 114, the fall arrest system 100 is not optimized because the safety line 110 has excess capacity that is not utilized. For example, by having a safety line 110 that substantially exceeds the $F_{max}$ of the energy absorber 114, the safety line 110 adds unnecessary weight and cost to the fall arrest system 100. Knowing the forces on the safety line 110 and energy absorber 114 from the testing described above with reference to FIGS. 4-7 allows for specifying the minimum breaking strength of the safety line 110 and the maximum deployment force of the energy absorber 114. Using this information, a fall arrest system 100 can be specified where the strength of the safety line 110 is properly matched to the $F_{max}$ of the energy absorber 114. In other words, the breaking strength of the safety line 110 and the maximum deployment force of the energy absorber 114 can be balanced against the actual load handling requirements known from test data. In order to optimize the size and strength of the safety line 110 and the energy absorber 114, a process performance index can be determined to assure that the fall arrest system 100 will produce an output within the designed performance limits (i.e., be able to safely withstand a load during a fall event that does not exceed the breaking strength of the safety line 110 or the maximum force of the energy absorber 114) within a predetermined design envelope.

Figure 8:
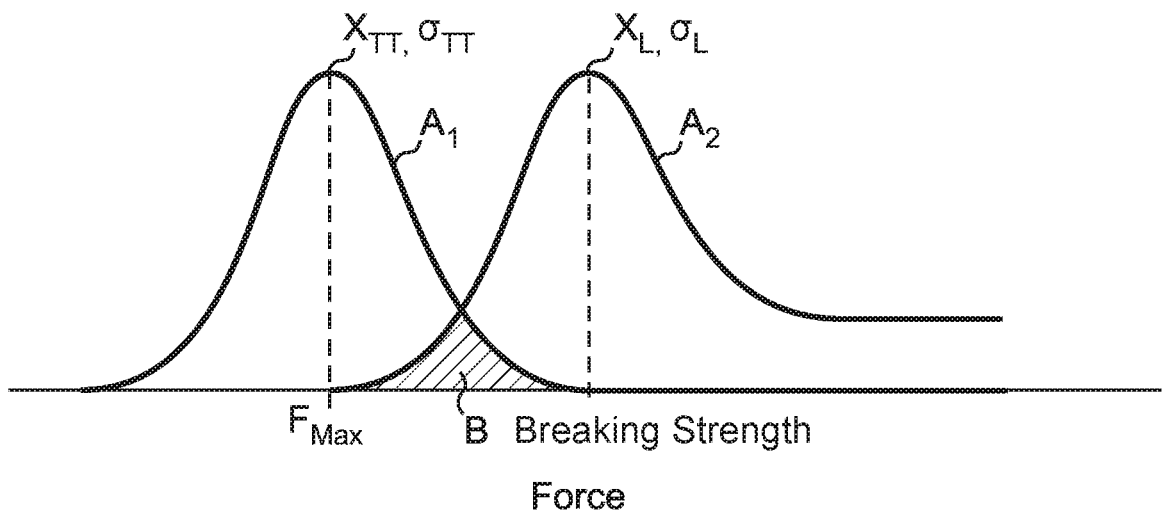
FIG. 8 is a graph showing a normal distribution of breaking strength of a safety line and a maximum deployment force of an energy absorber.

With reference to FIG. 8, a normal distribution curve A1 is fitted to a set of data points from testing the $F_{max}$ of the energy absorber 114. Curve A1 represents the normal distribution and standard deviation ($x_{tt}$, $\sigma_{tt}$) of the data for $F_{max}$ of the energy absorber 114. In other words, curve A1 represents a likelihood that the energy absorber 114 will produce a load that it is designed to produce. The peak of curve A1 represents an average $F_{max}$ of the energy absorber 114, indicating the force that the energy absorber 114 is most likely to produce. $F_{max}$ may represent the force that the energy absorber 114 is designed to produce. The slope of the curve A1 to the left side of the peak indicates that some percentage of energy absorbers 114 may have a lower $F_{max}$, while the slope of the curve A1 to the right side of the peak indicates that some percentage of energy absorbers 114 may have a higher $F_{max}$. Moving further away from the peak of curve A1 indicates a decreasing likelihood that the energy absorber 114 will not meet a predetermined $F_{max}$ specification.

FIG. 8 also includes a normal distribution curve A2 for test data points from testing the breaking strength of the safety line 110, showing the normal distribution and standard deviation ($x_L$, $\sigma_L$) of the data for the breaking strength of the safety line 110. In other words, curve A2 represents a likelihood that the breaking strength of the safety line 110 will fall within a predetermined breaking strength specified by the manufacturer of the safety line 110. The peak of curve A2 represents an average breaking strength of the safety line 110, indicating the force at which the safety line 110 is most likely to break. The slope of the curve A2 to the left side of the peak indicates that some percentage of safety lines 110 may have a lower breaking strength (i.e., may fail at a lower load than the minimum specification), while the slope of the curve A2 to the right side of the peak indicates that some percentage of safety lines 110 have a higher breaking strength (i.e., may fail at a higher load than the minimum specification). Moving further away from the peak of curve A2 indicates a decreasing likelihood that the safety line 110 will not meet a predetermined design specification.

As can be seen in FIG. 8, there is an overlap B between curves A1, A2. This overlap represents scenarios where the breaking strength of the safety line 110 is closely matched with $F_{max}$ of the energy absorber 114 such that the two may overlap. It is desirable to design a fall arrest system 100 where the breaking strength of the safety line 110 exceeds $F_{max}$ of the energy absorber 114 such that the breaking strength of the safety line 110 is outside of the overlap region B. In other words, the strength of the safety line 110 is selected to be higher than $F_{max}$ of the energy absorber 114 such that standard deviations in the respective values do not overlap.

Figure 9:
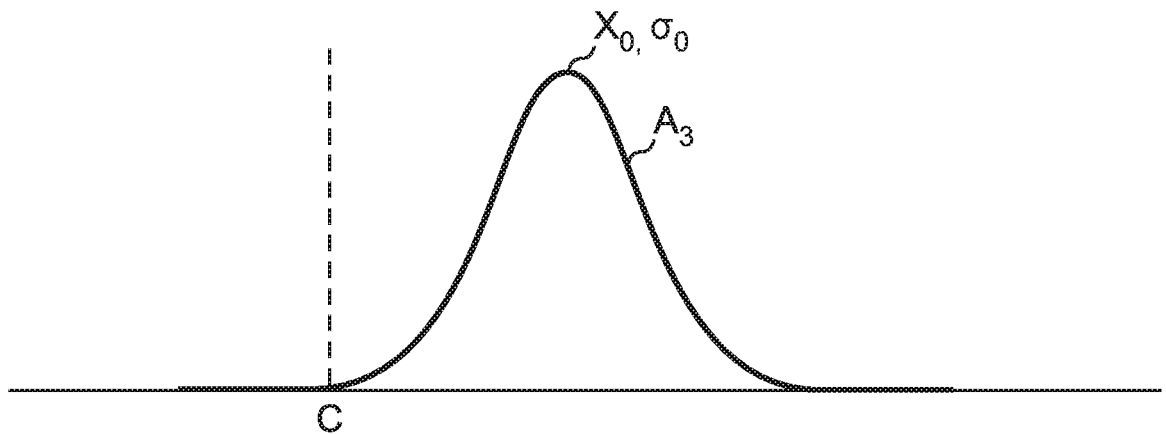
FIG. 9 is a normal distribution of an overlap between a breaking strength of a safety line and a maximum deployment force of an energy absorber shown in FIG. 8.

With reference to FIG. 9, the area of the overlap B in FIG. 8 is represented as a singular overlap distribution A3. FIG. 9 is obtained by subtracting the mean values of the breaking strength of the safety line 110 and $F_{max}$ of the energy absorber 114 ($x_o = x_L - x_{tt}$) and the sum of squares for the standard deviations ($\sigma_o = (\sigma_L^2 + \sigma_{tt}^2)^{1/2}$). The vertical line at zero indicates a point where the safety line 110 would break before the energy absorber 114 absorbed all of the energy of the fall.

The overlap distribution ($x_o$, $\sigma_o$) can be compared against the likelihood of being less than zero by means of a process performance index (Ppk calculation) using the following formula:

$$Ppk = \frac{xo - C}{3 * \sigma o}$$

where C is a desired performance threshold. In the case of designing a fall arrest system 100 having the overlap between the breaking strength of the safety line 110 and $F_{max}$ of the energy absorber 114 as the target design criteria, the C value is desirably 0, which means that the safety line 110 is designed to prevent breakage as the energy absorber 114 absorbs fall energy.

Larger values of Ppk are interpreted to indicate that the fall arrest system 100 is more capable of producing results within the specification limits (i.e., the safety line 100 not exceeding its breaking strength and the energy absorber 114 not exceeding its $F_{max}$). For example, a Ppk value of 2.00 would result in ~3 non-conformances per million attempts, and a Ppk of 0.50 would result in ~500,000 non-conformances per million attempts. Various values of Ppk and associated non-conformance occurrences are noted in Table I below.

| Ppk | # of non-conformances per million attempts |
| --- | --- |
| 0.50 | 500,000 |
| 0.75 | 226,627 |
| 1.00 | 66,807 |
| 1.25 | 12,224 |
| 1.50 | 1,350 |
| 1.75 | 88 |
| 2.00 | 3 |

By using a target Ppk value for the fall arrest system 100 (i.e., designing the fall arrest system to have a desired reliability), the relationship between the mean of the normal distribution of the overlap region ($x_o$) and the standard deviation ($\sigma_o$) thereof can be expressed in terms of a non-dimensional factor, referred herein as a "Harding factor", by the following equation:

$$F = \frac{xo}{\sigma o}$$

where Ⱶ (Greek symbol "heta") represents the Harding factor, $x_o$ represents the mean of the overlap region B and $\sigma_o$ represents standard deviation thereof. For a fall arrest system 100 designed to have 99.999% performance within the specification limits, the Harding factor is greater than or equal to 6 (Ⱶ=$x_o/\sigma_o$≥6). Similarly, for a fall arrest system 100 designed to have 50.00% performance within the specification limits, the Harding factor is greater than or equal to 1.5 (Ⱶ=$x_o/\sigma_o$≥1.5). The Harding factor provides a practical application of a ratio of mean force values and standard deviation in the overlap region for designing a fall arrest system 100 where the strength of the safety line 110 is properly matched to the $F_{max}$ of the energy absorber 114. In other words, the breaking strength of the safety line 110 and the maximum deployment force of the energy absorber 114 can be balanced to assure that the fall arrest system 100 will produce an output within the designed performance limits (i.e., be able to safely withstand a load during a fall event that does not exceed the breaking strength of the safety line 110 or the maximum force of the energy absorber 114) within a predetermined design envelope.

Although the disclosure has been described in detail for the purpose of illustration based on what is currently considered to be the most practical and preferred embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A fall arrest system comprising:
a line retraction device configured for connecting to an anchoring point, the line retraction device having a safety line;
an energy absorber configured for connecting to a terminal end of the safety line; and
a harness configured for connecting to the energy absorber such that the energy absorber is disposed between the terminal end of the safety line and the harness,
wherein the safety line is selected to have a predetermined mean breaking force with a first standard deviation,
wherein the energy absorber is selected to have a predetermined mean deployment force with a second standard deviation,
wherein the mean breaking force of the safety line and the mean deployment force of the energy absorber overlap over an overlapping region of the first and second standard deviation, and
wherein a ratio of an overlap mean force of the overlapping region to an overlap standard deviation of the overlapping region is less than or equal to 6.

2. The fall arrest system according to claim 1, wherein the overlap mean force is based on a difference between the mean breaking force of the safety line and the mean deployment force of the energy absorber.

3. The fall arrest system according to claim 1, wherein the overlap standard deviation is based on sum of squares of the first and second standard deviations.

4. The fall arrest system according to claim 1, wherein a normal distribution of the overlap mean force and the overlap standard deviation is greater than zero.

5. The fall arrest system according to claim 1, wherein the safety line is made from a flat webbing material.

6. The fall arrest system according to claim 5, wherein the flat webbing material is a woven material.

7. The fall arrest system according to claim 1, wherein the energy absorber is a tear tape having two load-bearing webbing components woven together by binder threads.

8. The fall arrest system according to claim 1, wherein the energy absorber is a tear tape having two load-bearing webbing adhesively connected together.

9. The fall arrest system according to claim 1, wherein the line retraction device is a self-retracting lanyard.

10. The fall arrest system according to claim 1, wherein the safety line is wound within a housing of the line retraction device whereby the safety line is configured to be unwound from the housing when a tension force applied to a first end of the safety line is above a predetermined threshold, and wherein the safety line is configured to be rewound into the housing when the tension force applied to the first end of the safety line is above the predetermined threshold.

11. A method for determining a minimum load handling requirement for components of a fall arrest system, the method comprising:
providing the fall arrest system having a safety line and an energy absorber;
determining a mean breaking force of the safety line and a standard deviation of the mean breaking force;
determining a mean deployment force of the energy absorber and a standard deviation of the mean deployment force;
determining an overlap mean force based on the mean breaking force and the mean deployment force;
determining an overlap standard deviation based on the standard deviation of the mean breaking force and the standard deviation of the mean deployment force; and
determining a ratio between the overlap mean force and the overlap standard deviation, the ratio being less than or equal to 6.

12. The method according to claim 11, wherein the overlap mean force is based on a difference between the mean breaking force of the safety line and the mean deployment force of the energy absorber.

13. The method according to claim 11, wherein the overlap standard deviation is based on sum of squares of the first and second standard deviations.

14. The method according to claim 11, wherein a normal distribution of the overlap mean force and the overlap standard deviation is greater than zero.

15. The method according to claim 11, wherein the safety line is made from a flat webbing material.

16. The method according to claim 11, wherein the energy absorber is a tear tape having two load-bearing webbing components woven together by binder threads.

17. The method according to claim 11, wherein the energy absorber is a tear tape having two load-bearing webbing adhesively connected together.

18. The method according to claim 11, wherein the line retraction device is a self-retracting lanyard.

19. The method according to claim 11, wherein the safety line is wound within a housing of the line retraction device whereby the safety line is configured to be unwound from the housing when a tension force applied to a first end of the safety line is above a predetermined threshold, and wherein the safety line is configured to be rewound into the housing when the tension force applied to the first end of the safety line is above the predetermined threshold.

20. A method for fabricating a fall arrest system comprising:
first determining a mean breaking force for each of a plurality of safety lines and a corresponding standard deviation of the mean breaking force;
second determining a mean deployment force for each of a plurality of energy absorbers and a corresponding standard deviation of the mean deployment force;
determining, for each pair of safety line and energy absorber, an overlap mean force based on the mean breaking force and the mean deployment force;
determining, for each pair of safety line and energy absorber, an overlap standard deviation based on the standard deviation of the mean breaking force and the standard deviation of the mean deployment force; and
determining, for each pair of safety line and energy absorber, a ratio between the overlap mean force and the overlap standard deviation, the ratio being less than or equal to 6;
selecting the pair of safety line and energy absorber that meets a predetermined minimum load handling requirement; and
assembling the fall arrest system with the selected pair of safety line and energy absorber.

* * * * *